United States Patent [19]
Kelén

[11] Patent Number: 5,896,433
[45] Date of Patent: Apr. 20, 1999

[54] METHOD OF PREVENTING THE DEPOSITION OF RADIOACTIVE CORROSION PRODUCTS IN NUCLEAR PLANTS

[75] Inventor: Tormod Kelén, Strängnäs, Sweden

[73] Assignee: ABB Atom AB, Vasteras, Sweden

[21] Appl. No.: 08/799,630

[22] Filed: Feb. 12, 1997

[30] Foreign Application Priority Data

Feb. 15, 1996 [SE] Sweden ............... 9600496

[51] Int. Cl.$^6$ ............... G21C 9/00; G21C 19/42
[52] U.S. Cl. ............... 376/306; 376/310; 376/313
[58] Field of Search ............... 376/306, 310, 376/313, 904

[56] References Cited

U.S. PATENT DOCUMENTS

| | | | |
|---|---|---|---|
| 4,950,449 | 8/1990 | Petersen et al. | 376/306 |
| 5,015,436 | 5/1991 | Nagase et al. | 376/306 |
| 5,171,515 | 12/1992 | Panson et al. | 376/306 |

FOREIGN PATENT DOCUMENTS

| | | |
|---|---|---|
| 0 328 872 | 8/1989 | European Pat. Off. |
| 0 540 201 | 5/1993 | European Pat. Off. |
| 0 671 486 | 3/1995 | European Pat. Off. |
| WO 96/00447 | 1/1996 | WIPO |

*Primary Examiner*—Charles T. Jordan
*Assistant Examiner*—Matthew J. Lattig
*Attorney, Agent, or Firm*—Pollock, Vande Sande & Amernick

[57] ABSTRACT

Metal ions are added to a circuit (20, 30) for the reactor water or feed water of a nuclear plant. This is accomplished by dissolving a soluble metal compound the counter-ion of which is possible to decompose to gaseous products and water in water in a reaction vessel (41) in an equipment arrangement (40). The solution is subsequently conducted to a series of vessels (42) for the decomposition of the counter-ion. The solution is then possibly transformed to a mixture or a slurry which is conducted to a vessel (43) for degassing the gaseous products before the addition to the circuit (20, 30) for the reactor water or feed water.

16 Claims, 1 Drawing Sheet

METHOD OF PREVENTING THE DEPOSITION OF RADIOACTIVE CORROSION PRODUCTS IN NUCLEAR PLANTS

THE FIELD OF THE INVENTION

The present invention relates to a method of preventing the deposition of radioactive corrosion products in nuclear plants of the boiling water reactor type, which comprises a reactor with a reactor core, onto surfaces outside the reactor core in direct or indirect contact with reactor water.

BACKGROUND OF THE INVENTION

It is most desirable to decrease the radiation doses to which the personnel at nuclear plants is subjected. A major part of these radiation doses is absorbed during the execution of overhaul, service and reparation operations when the nuclear plant is shut off, the personnel among other things being subjected to radiation doses while working with pumps, conduits and the like of a reactor water circuit outside the reactor core. The reason for this is that radioactive corrosion products are deposited on surfaces of system parts outside the very core. Co-60 stands for an absolutely major part of the radioactive radiation from these corrosion products. Furthermore, it has a half-life of 5.3 years, which means that it is not practically possible to decrease the level of the radioactive radiation by letting the personnel execute the work after the reactor has been shut off for a certain period.

In the reactor water circuit and a feed water circuit water causes precipitation of small amounts of material from the different components with which it comes into contact. A major part of these components are made of stainless steel from which iron, nickel and small amounts of cobalt are precipitated as ions and particles. In older nuclear plants certain components in the reactor and feed water circuits, such as valves, contain cobalt, which increases the amount of precipitated cobalt. The metals precipitated in the reactor water and the feed water are deposited in the shape of oxides, such as so called "crud", onto surfaces in the circuit. The crud-surfacing exists as different types of metal oxides, and these, as they for instance are located on cladding tubes for nuclear fuel, are subjected to a strong neutron radiation. Thereby, the metal atoms in the crud surfacing are transformed into isotopes, a part of these being radioactive. Particles fall off and ions are precipitated from the radioactive crud-surfacing and are in that way transferred to the water. Thereby, the particles and the ions are transported together with the reactor water to parts located outside the core and thereby spread radioactive material to those parts. The radioactive particles and the ions are then deposited as a secondary deposited crud-surfacing onto surfaces outside the core. Accordingly, a radioactive crud-surfacing is also produced outside the core, and it is this crud-surfacing that results in the personnel being subjected to radiation doses during service and reparation operations.

In order to restrain the formation of radioactive corrosion products on surfaces of system parts outside the core several, amongst other the following, approaches have been used. According to one approach the crud-surfacing on the fuel is affected such that it is transformed to oxide structures with low solubility, for example a spinel structure. Thereby, the reaction (I) may for instance be used $$(Ni,Co)O + Fe_2O_3 \rightarrow (Ni,Co)Fe_2O_4 \qquad (I)$$

where (Ni,Co)O indicates nickel oxide contaminated with cobalt, $Fe_2O_3$ indicates hematite, and $(Ni,Co)Fe_2O_4$ indicates structures of a spinel type, the two first mentioned having a higher solubility in water than the last one during operation conditions. To bring the reaction generally totally to the right, an excess of iron is secured by means of different methods. Thereby, substantially all cobalt ions will make part of the spinel structures, and thereby they will have a relatively low solubility in water, something that substantially decreases the spreading of radioactive corrosion products to system parts located outside the core. According to another approach, the cobalt ions and the cobalt atoms in the oxide surfacing are subjected to competition through an addition of zinc ions to the reactor water. The zinc and cobalt ions are then competing for the same seats in the oxide structures. Thereby, the zinc ions push the cobalt ions aside, and, therefore, Co60 is not absorbed so rapidly on the surfaces of the system parts. The cobalt ions in the water may then be removed during the usual continuous reactor water purification.

The reason for the possible shortage of iron (III) oxide in the reactor water during the reaction (I) is that the continuous condensate purification sometimes is too effective as to purification of iron. The striving for purifying the water as much as possible results in too large amounts of iron being removed, which results in an iron deficit in the reactor water. Therefore, according to Japanese prior art a part of the condensate is conducted past the purification plant in order to, in that way, decrease the amount of iron (III) oxide removed during purification. This method has the important disadvantage of also resulting in an increased amount of cobolt ions in the reactor water.

Another Japanese method according to prior art adds iron (III) oxide to the reactor water through anodic dissolution of iron.

Another method according to prior art adds iron (III) ions in the shape of iron (III) oxalate. The oxalate ion is thereby decomposed in the reactor. The method has the advantage that iron (III) oxalate is soluble in water while a decomposition of the oxalate ion only results in carbon dioxide and water, the carbon dioxide leaving the water in the shape of gas together with steam. A disadvantage is that, during the decomposition of the oxalate ion, carbonic acid is formed, which lowers the pH-value and thereby may result in attacks onto the construction material and the crud-surfacing. Furthermore, the oxalate ion is not decomposed momentarily, but remains a short time in the reactor water, and it is possible that, during this time, it may create problems concerning spreading of radioactivity and corrosion.

Prior art concerning addition of zinc ions to the reactor water or feed water in a nuclear plant provides a method where the zinc ions are added in the shape of organic salts and where the organic counter-ion is decomposed to gaseous products and water in the reactor. Just like the addition of iron in the shape of iron (III) oxalate, this method has the disadvantage of the counter-ion existing in the cooling water during a time period before it is decomposed, and organic acids and finally carbonic acid being formed during the decomposition.

Accordingly, prior art does not provide any accessible method that is substantially free from secondary effects and effective in preventing the deposition of radioactive corrosion products onto surfaces of system parts located outside the core.

SUMMARY OF THE INVENTION

The object of the present invention is to provide a method that solves the above problems.

This object is obtained by means of the method initially defined, which is characterized by the steps of preparing a solution comprising ions of at least one metal by dissolving at least one soluble compound of this metal, decomposing the counter-ions from the compound in the solution to gaseous products, and adding the compound, which possibly has been transformed into a mixture or a slurry, to a circuit for reactor water or feed water. The advantage of the method according to the invention is that the metal ions are added to the circuit in the absence of other ions that may disturb the processes in the plant. Because no decomposition of organic ions is taking place in the reactor, no organic acids which lower the pH-value of the cooling water and thereby may result in attacks on the construction material and the crud-surfacing are formed.

According to one embodiment of the invention the counter-ions decomposed to gaseous products are degassed from the solution/mixture/slurry before the latter is added to the reactor water or feed water. This implies that, in a reliable way, it is guaranteed that no such ions in the shape of gaseous products dissolved in water are supplied to the primary cooling circuit.

According to another embodiment of the invention the solution is prepared by dissolving at least one soluble metal compound that has one or more counter-ions which at least not only result in gaseous products while being decomposed, and, before the decomposition and addition to the circuit for the reactor water or the feed water, exchanging these counter-ions for counter-ions that result in gaseous products when being decomposed. The use of this exchange of counter-ions is suitable when metal compounds soluble in water and containing counter-ions that are decomposable to gaseous products are missing, are of difficult access or are extremely expensive. The embodiment thus makes the use of the method according to the invention possible also in such cases.

According to another embodiment of the invention the decomposition is accomplished by an increase of the temperature. The embodiment has the advantage that no agents are added to the solution during the decomposition, which agents could create problems concerning the spreading of activity and corrosion.

According to another embodiment of the invention the decomposition is accomplished through the addition of one or more oxidizing agents. According to an application of the embodiment, oxidizing agents that are gaseous or that result in gaseous products when being decomposed are used. According to another application of the embodiment at least one of hydrogen peroxide and ozone is used as the oxidizing agent. Thanks to these oxidizing agents being gaseous, it is guaranteed that no such agents remain in the reactor water or the feed water.

According to another embodiment of the method of the invention the decomposition is accomplished through the use of UV-irradiation. Likewise to the case of increased temperature, the lack of compounds added during the decomposition implies a guarantee that no agents thereof are added to the reactor water or the feed water.

According to another embodiment of the method of the invention the decomposition is accomplished through the use of ultrasonics. Likewise to the preceding embodiment, this guarantees that no agents, originating from the decomposition treatment, are added to the reactor water or feed water.

According to another embodiment of the method of the invention, the metal compound is an organic salt. This implies that the counter-ion is organic and thereby possible to decompose to gaseous products, such as carbon dioxide, and water.

According to another embodiment of the method of the invention the metal compound comprises iron. This is advantageous in nuclear plants that suffer from an iron deficit in the reactor water. According to one application of the embodiment the metal compound comprises iron (III) ions. These ions are active at conditions of iron deficit in the reactor water. According to another application of the embodiment the supply of iron to the reactor or feed water is controlled such that conditions are created where a formation of corrosion products, such as spinels, $MeFe_2O_4$, with comparatively lower dissolving rates during operation conditions are promoted while a formation of corrosion products such as metal oxides, MeO, with a comparatively higher dissolving rate in water at operation conditions are suppressed. This implies that a major part of the radioactive corrosion products in the reactor will make part of structures with low solubility in water at operation conditions, and thereby generally will not be dissolved in the water. Accordingly, the spreading of radioactive corrosion products to system parts located outside the core is inhibited. According to another application of the method of the invention, the compound is at least one of iron (III) oxalate and iron (III) acetate. Both these compounds are soluble in water and provide counter-ions which only result in gaseous products after being decomposed.

According to another embodiment of the method of the invention, the metal compound comprises zinc. According to an application of the embodiment the supply of zinc to the reactor water or the feed water is controlled such that the zinc content of the water is kept at such a level that the zinc ions compete with the cobalt ions concerning adsorption onto said surfaces. Thereby, a part of the cobalt ions will not make part of the corrosion products but will be in the shape of ions in the water. According to another application of the embodiment the zinc content of the water is kept at such a level that the zinc ions generally outcompete the cobalt ions during adsorption on said surfaces. The oxide surfacing will therefore generally contain zinc instead of cobalt and Co60, which will find themselves dissolved in the water. According to another application of the embodiment the cobalt ions in the water in the reactor water circuit or the feed water circuit are separated. According to another application of the embodiment the compound is at least one of zinc citrate, zinc phthalate, zinc lactate, zinc oxalate, zinc tartrate and zinc valerate. Each one of these zinc compounds is soluble in water and has an organic counter-ion which only results in gaseous products while being decomposed.

According to another embodiment of the method of the invention the exchange of counter-ions is accomplished through the use of an ion exchanger.

According to another embodiment of the method of the invention, the metal compound that comprises counter-ions which not only produce gaseous products while being decomposed is an inorganic metal salt. According to one application of the embodiment the metal compound is a metal nitrate. Nitrates in general are soluble and, therefore, suitable to use as a soluble initial compound.

BRIEF DESCRIPTION OF THE DRAWING

The present invention will now be described more in detail with reference to embodiments shown on the enclosed drawing.

DETAILED DESCRIPTION OF EMBODIMENTS

Figure 1:
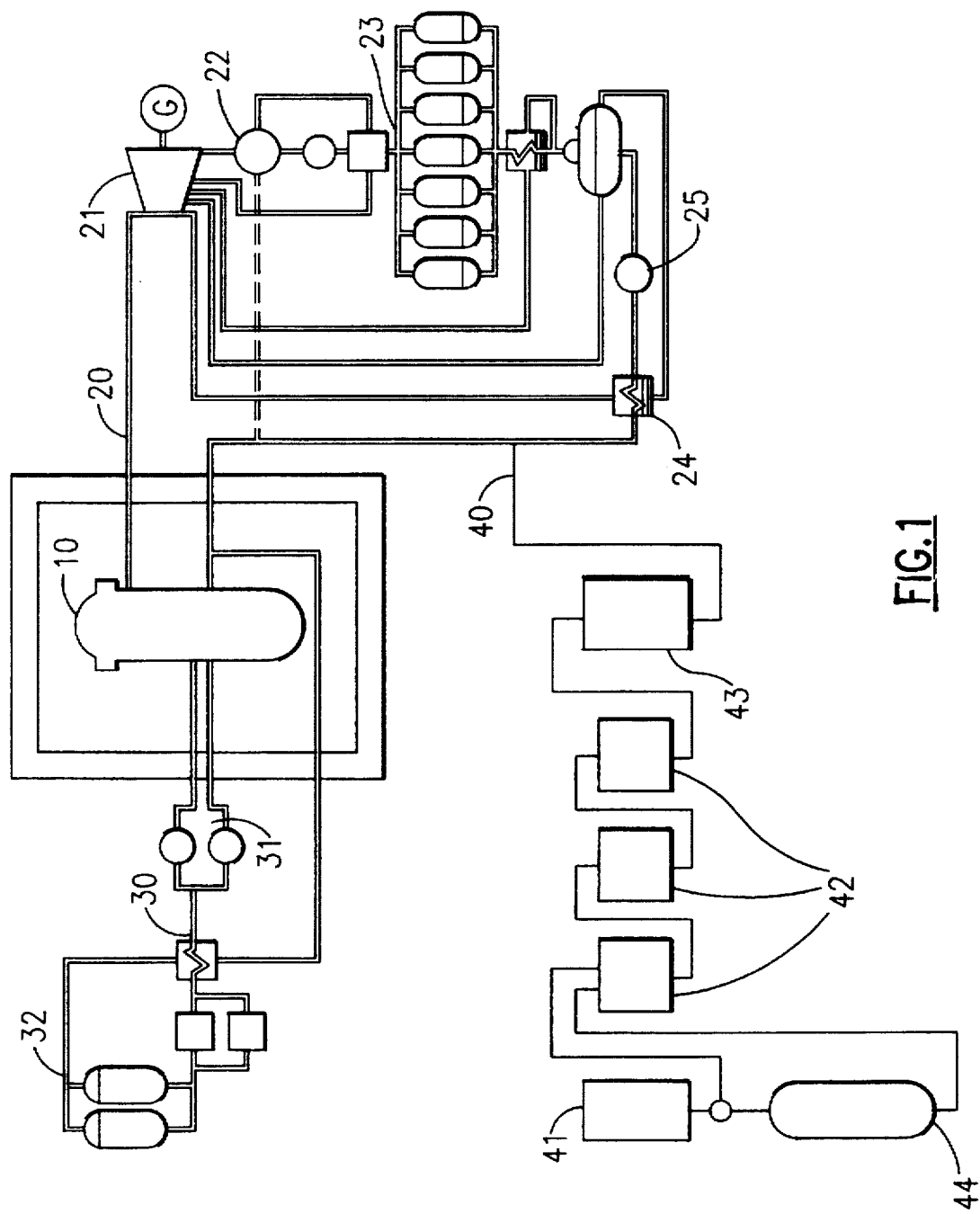
FIG. 1 is a schematic drawing of a heat generating nuclear power plant with a boiling water reactor to the primary cooling circuit of which metal ions are supplied according to the method of the present invention.

In FIG. 1 a heat generating nuclear power plant with a boiling water reactor in which a heat producing core with fuel elements and control rods are arranged in a reactor tank 10 filled with water is shown. The reactor core is cooled through systems of circuits 20, 30 for the reactor and feed water connected to the reactor tank 10. Steam formed in the reactor core is conducted to a steam turbine 21 where the steam is expanded while providing energy to a rotor of the turbine 21. After having passed through the turbine 21 the steam is condensed in a condenser 22 which comprises cooling water circuits with pumps. The condensate pumps pump the condensate from the condenser 22 through a condensate purification filter 23, and after preheating in a preheater 24, back into the reactor tank 10 by means of a pump 25. Shown in the figure is also a circulation system 30 with means 31 for the cooling of the reactor water in connection with the shut off of the reactor, and means 32 for purification of reactor water.

To control and delimit the generation of a radiation field in circuits 20 and 30 connected to the reactor tank 10 during the operation of the power plant, metal ions in a suitable shape are supplied to the water which circulates in the reactor tank 10 and the circuits 20 and 30. According to the method of the present invention the metal ions are supplied in the shape of a solution, mixture or slurry from an equipment arrangement 40. This solution, mixture or slurry is prepared by dissolving a soluble metal compound, the counter-ion of which is possible to decompose to gaseous products and water, in water in a reaction vessel 41 in the equipment 40. The dissolution takes place while stirring and possibly, while heating and results in a solution that comprises metal ions and counter-ions. The solution is then conducted to a series of vessels 42 for decomposing the counter-ion to gaseous products and water. This decomposition takes place during stirring, by means of heating, adding of oxidizing agents, UV-irradiation of the solution or ultrasonic treatment of the same. It is suitable to use a combination of heating, oxidizing agents and UV-irradiation. Suitable oxidizing agents are such ones that produce gaseous products and possibly water when being decomposed, such as hydrogen peroxide and ozone. When being decomposed, the solution is transformed to a finally dispersed slurry which is conducted to a vessel 43 for degassing the gaseous products before the slurry is supplied to the circuits 20 and 30.

In those cases when the requested metal ions cannot be obtained in a compound the counter-ion of which only produces gaseous products when being decomposed, it is possible to dissolve another soluble compound of the metal in the reactor vessel 41 and then conduct the solution obtained to an ion-exchanger column 44 charged with counter-ions that only produce gaseous products during a decomposition, in order to exchange the counter-ions first mentioned in the solution for the counter-ions in the column. The obtained solution, mixture or slurry is further conducted to the vessels 42 arranged in series, for a decomposition of the anion to gaseous products, and is then conducted to the vessel 43 for degassing, as earlier described, and is thereafter supplied to the circuits 20 and 30. Suitable metal ions to be supplied to the primary cooling circuits 20, 30 are, as previously mentioned, iron (III) ions and zinc ions. These ions supplied to the feed water are present in the same state as the ions that are supplied to the water in the circuits 20 and 30 and the reactor tank 10 through natural corrosion. The addition of metal ions is controlled such that an optimum content is obtained and maintained in the feed water.

The positioning of the arrangement 40 for the use of the method according to the invention is not critical, and, in principal, it may be located wherever in connection to the circuits 20 and 30, preferably in connection to the circuit 20.

Example

Iron (III) oxalate, $Fe_2(C_2O_4)_3$, is dissolved in water in the reaction vessel 41 during stirring and heating. The solution is then conducted to the series of vessels 42 for decomposing the counter-ion under the action of heating, addition of hydrogen peroxide and UV-irradiation. The oxalate ion thereby reacts with the hydrogen peroxide according to the reaction:

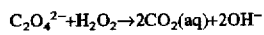

$$C_2O_4^{2-}+H_2O_2 \rightarrow 2CO_2(aq)+2OH^-$$

the hydroxide ions formed during the reaction precipitating iron (III) hydroxide and corresponding oxide hydroxides, alternatively oxides. Thereby, a slurry of iron (III) oxide hydroxide which is finely distributed in water and free from other ions is formed. The slurry is conducted to the vessel 43 for degassing the carbon dioxide, whereafter it is supplied to the primary cooling circuit 20. Thanks to the slurry being finely distributed, the iron (III) ions are easily accessible for a reaction in the circuit 20 or 30.

I claim:

1. A method of preventing the deposition of radioactive corrosion products in nuclear plants of the boiling water reactor type, comprising a reactor with a reactor core, onto surfaces outside the reactor core in direct or indirect contact with the reactor water, characterized by the steps of;

preparing a solution comprising ions of at least one metal by dissolving at least one soluble compound of this metal, decomposing the counter-ion or counter-ions from the compound in the solution to gaseous products, adding the solution to a circuit for reactor water or feed water.

2. A method according to claim 1, characterized in that the counter-ions decomposed to gaseous products are degassed from the solution before the latter is added to the circuit for the reactor water or feed water.

3. A method according to claim 1, characterized by the steps of:

preparing the solution by dissolving at least one soluble metal compound that has one or more counter-ions which, during decomposition, do not only result in gaseous products and before decomposition and addition to the circuit for the reactor water or feed water, exchanging these counter-ions for counter-ions that result in gaseous products while being decomposed.

4. A method according to claim 1, characterized in that the decomposition is accomplished by the use of UV-irradiation.

5. A method according to claim 1, characterized in that the metal compound is an organic salt.

6. A method according to claim 3, and any one of the preceding claims, characterized in that the exchange of counter-ions is accomplished through the use of an ion exchanger.

7. A method according to claim 2, characterized by the steps of:

preparing the solution by dissolving at least one soluble metal compound that has one or more counter-ions which, during decomposition, do not only result in gaseous products; and before decomposition and addition to the circuit for the reactor water or feed water, exchanging these counter-ions for counter-ions that result in gaseous products while being decomposed.

8. The method according to claim 1, wherein the solution is transformed into a mixture.

9. The method according to claim 1, wherein the solution is transformed into a slurry.

10. A method according to claim 2, characterized in that the decomposition is accomplished with UV-irradiation.

11. A method according to claim 3, characterized in that the decomposition is accomplished with UV-irradiation.

12. A method according to claim 7, characterized in that the decomposition is accomplished with UV-irradiation.

13. A method according to claim 2, characterized in that the metal compound is an organic salt.

14. A method according to claim 3, characterized in that the metal compound is an organic salt.

15. A method according to claim 7, characterized in that the metal compound is an organic salt.

16. A method according to claim 7, characterized in that the exchange of counter-ions is accomplished utilizing an ion exchanger.

* * * * *